United States Patent Office 3,075,972
Patented Jan. 29, 1963

---

3,075,972
ETHYL 2-[1-(5-NITROFURFURYLIDENEAMINO)-2,4 - DIOXO - 3 - IMIDAZOLIDYL]ETHYLCARBAMATE
Julian Getz Michels, Norwich, N.Y., assignor to The Norwich Pharmacal Company, a corporation of New York
No Drawing. Filed Dec. 27, 1960, Ser. No. 78,304
2 Claims. (Cl. 260—240)

This invention relates to a new chemical compound, ethyl 2 - [1-(5-nitrofurfurylideneamino)-2,4-dioxo-3-imidazolidyl]ethylcarbamate, represented by the formula:

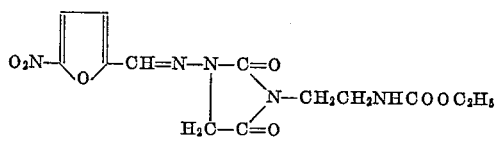

I have discovered that this new compound is a chemotherapeutic agent distinguished by its ability to combat systemic staphylococcal infection upon oral administration to animals. My new compound is relatively nontoxic as mice tolerate a dose as high as 2200 mg./kg. without ill effect. Mice lethally infected with *Staphylococcus aureus* are protected when given far less than a toxic dose of this compound. A single dose of 210 mg./kg. administered orally one-half hour post infection protects 70% of the mice. A dose of 70 mg./kg. administered at one-half, four and eight hours post infection protects 80% of the mice.

My new compound is easily formulated with common excipients and adjuvants which are not incompatible therewith to provide tablets, suspensions, elixirs, lozenges and the like.

The method which I now prefer to follow in the preparation of my new compound consists in reacting sodium 1-benzylideneaminohydantoin with 2-chloroethylurethane under the influence of heat in the presence of an organic solvent such as dimethylformamide. The solvent is removed under reduced pressure and the residue is steam distilled in acidified aqueous medium. Thereafter, the solution is treated with 5-nitro-2-furaldehyde, or a reactive derivative thereof which is hydrolyzable thereto in the reaction medium, to form the desired end product.

In order that my invention will be fully available to those skilled in the art, the following method of preparing my new compound is described briefly:

EXAMPLE

*Ethyl 2-[1-(5-Nitrofurfurylideneamino)-2,4-Dioxo-3-Imidazolidyl]Ethylcarbamate*

To a solution of 51 g. (0.25 mole) of 1-benzylideneaminohydantoin in 1250 cc. of dimethylformamide is added 11.0 g. (0.25 mole) of 55% sodium hydride in mineral oil. When the hydride has reacted, 38.5 g. (0.26 mole) of 2-chloroethylurethane (Ann. 566:239 (1950)) is added and the mixture heated at 105–110° overnight. After cooling, the salt is filtered and the dimethylformamide solution evaporated to dryness under reduced pressure. The residue is steam distilled in the presence of dilute sulfuric acid. The aqueous solution is treated with charcoal, filtered and reacted with a solution of 35 g. of 5-nitro-2-furaldehyde in alcohol. The crude ethyl 2 - [1-(5-nitro-furfurylideneamino)-2,4-dioxo-3-imidazolidyl]ethylcarbamate is filtered, washed with water, alcohol and ether and dried at 110°. There is obtained 59 g. (67%) of crude ethyl 2-[1-(5-nitro-furfurylideneamino) - 2,4-dioxo-3-imidazolidyl]ethylcarbamate. Two recrystallizations from 100 cc. of nitro-methane using charcoal gives 46 g. of purified product melting at 176–177°.

What I claim is:

1. The compound, ethyl 2-[1-(5-nitrofurfurylideneamino) - 2,4 - dioxo-3-imidazolidyl]ethylcarbamate, represented by the formula:

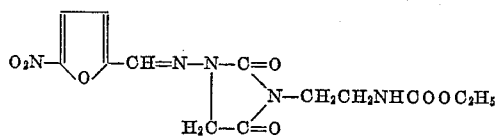

2. The method of preparing ethyl 2-[1-(5-nitrofurfurylideneamino) - 2,4-dioxo-3-imidazolidyl]ethylcarbamate which comprises reacting an alkali metal salt of 1-benzylideneaminohydantoin with 2-chloroethylurethane in the presence of an organic solvent and under the influence of heat to produce ethyl 2-[1-(benzylideneamino)-2,4-dioxo-3-imidazolidyl]ethylcarbamate; subjecting said benzylidene compound to steam distillation in the presence of sulfuric acid; and adding 5-nitro-2-furaldehyde to the residue of said distillation.

References Cited in the file of this patent

UNITED STATES PATENTS 2,990,402    Jack et al. _____ June 27, 1961

OTHER REFERENCES

Ware: Chemical Reviews, vol. 46, pages 427–428 (1950).